April 11, 1967 R. F. GIBB 3,314,023
SATURABLE CORE OSCILLATOR WITH ANOTHER SATURABLE
CORE DETERMINING FREQUENCIES AT HEAVIER LOADS
Filed April 16, 1965

INVENTOR.
ROBERT F. GIBB
BY
*Richard K. Macneill*

United States Patent Office 3,314,023
Patented Apr. 11, 1967

3,314,023
SATURABLE CORE OSCILLATOR WITH ANOTHER SATURABLE CORE DETERMINING FREQUENCIES AT HEAVIER LOADS
Robert F. Gibb, Solana Beach, Calif., assignor to Topaz, Inc., San Diego, Calif., a corporation of California
Filed Apr. 16, 1965, Ser. No. 448,594
6 Claims. (Cl. 331—113)

The present invention relates to a transformer core flux switching oscillator with load current limiting, and with inherent self protection from overloads.

In the standard transformer core flux switching oscillator the transistors alternate from one conducting to the other conducting whenever there is a rise in the transistor and transformer primary current due to the transformer core saturating. More precisely, when the core reaches a flux density where the permeability of the core decreases rapidly, the decrease in permeability causes the primary inductance to decrease, thereby increasing the primary current through the transistors. Since the transistors have a maximum current carrying capability determined by their gain and the base drive current, they soon fail to support the rising current and begin to have a large voltage drop. This drop in voltage across the transistor is subtracted from the voltage impressed upon the transformer primary, thus reducing the base drive (due to the positive base drive feedback) causing even more voltage to be dropped. This cycle once started, rapidly continues until the conducting transistor is turned "Off." As the flux breaks down in the transformer, the resulting electromotive force drives the transistor bases in the opposite direction, and the previously non-conducting transistor is turned "On."

The essential occurrence in the above sequence which causes switching is the voltage drop on the primary winding caused by the voltage drop which appears across the transistor at the end of the half cycle. In the prior art inverters of this type, if the initial load was larger than the inverter design allowed for, one of two things could happen. If the overload was very severe, the voltage drop across the transistor would cause the positive feedback bias on the transistor to be so small that the transistor would not turn on and the transistors would only conduct the quiescent bias current. With proper design, this current would not damage the inverter for relatively long periods of overload. Unfortunately, in order for the overload to be severe enough to cause the transistors not to ever "turn on," the loads had to be short circuit or very nearly short circuit loads. This left a large range of overloads in which the following sequence would occur: An initial current flows through the transistor which is great enough to cause a large voltage drop, but the transistor receives enough bias to turn on. Because of the relatively lower voltage on the primary, the core now requires longer to saturate, due to the lower voltage impressed on it, the characteristic frequency of the inverter is thus reduced, and the transistors conduct with a large voltage drop on them, causing excessive heating, which usually destroys the transistor in a short period of time.

With the prior art inverters it can be easily seen that for a great many types of overloads, the inverters were self destructive.

Also with certain types of loads such as incandescent light bulbs, the starting current when the filament is cold was so high that it required an inverter with a much higher than necessary output power rating to heat the cold filament.

According to this invention, a transformer core flux switching oscillator is used with a saturable core inductor in series with the transformer secondary winding and the load. With this arrangement the oscillator has three distinct modes of operation. In the first there is no load on the transformer secondary winding. With this condition the oscillator functions exactly as if it did not have the additional choke since there is no current flowing through it. The second mode of operation is with a load current flowing through it. The second mode of operation is with a load current that is no greater than the transistors can conduct at their designed drive level without having an increased voltage dropped across them. Under this condition the choke has a current through it that is determined by the load plus the choke impedance. This current causes the core in the choke to saturate in a period of time determined by the choke design. When saturation occurs the impedance of the choke suddenly approaches zero and the inverter output current is determined by the load only. The conducting transistor continues to conduct since the voltage on the transformer windings has remained constant. The third mode of operation occurs when the load current is great enough to cause the conducting transistor to exhibit an increased voltage drop. When this condition exists, the circuit functions as in mode two until the choke saturates. At this time the current rises to a value too great for the conducting transistor to supply, and the voltage across the transistor rises, causing the voltage on the primary of the transformer to decrease. This causes the base drive to the conducting transistor to decrease effecting an even greater drop in drive voltage. Through this regenerative effect, the conducting transistor is turned "Off" and the non-conducting transistor turned "On." The current through the choke is now reversed and the inductance is high until saturation again occurs. The switching frequency is thus increased (since it is being determined by the saturating inductor) and current is limited because of the inductance added by this inductor to the secondary circuit.

The above described overload mode condition occurs for loads exceeding the transistor current carrying capabilities all the way to a short circuit. With this current limiting inverter, loads such as light bulbs can be started, since the inverter continually supplies current at a reduced voltage until the filament is heated. Hence, this inverter is load current limiting and self-protecting under any load condition.

An object of the present invention is the provision of a transformer core flux switching oscillator having automatic load current limiting.

Another object is to provide a transformer core flux switching oscillator which will oscillate under extremely heavy load conditions.

Yet another object is to provide a transformer core flux switching oscillator which is inherently self-protecting for all overload conditions.

Another object of the invention is to provide a transformer core flux switching inverter which has inherently improved frequency regulation and voltage regulation with varying loads.

A further object of the invention is the provision of a transformer core flux switching oscillator with load current limiting which is simple, inexpensive and compact.

Other objects and many attendant advantages of this invention will be readily appreciated as the same becomes better understood by reference to the following detailed description when considered in connection with the accompanying drawings, in which like reference numerals designate like parts throughout the figures whereof, and wherein.

Figure 1:
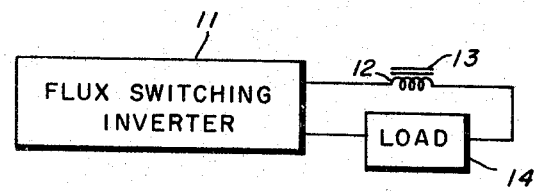
FIG. 1 is a simplified block diagram of a flux switching oscillator employing the instant invention.

Referring to FIG. 1, a flux switching inverter 11 is coupled through inductance 12 having a saturable core 13 to load 14.

Figure 2:
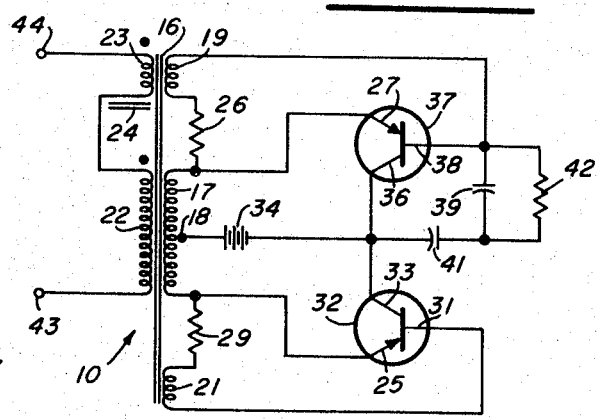
FIG. 2 is a schematic representation of a transformer core flux switching oscillator incorporating the present invention.

Referring to FIG. 2, saturable core 16 of transformer 10 has primary 17 with center tap 18, feedback windings 19 and 21, and secondary windings 22 and 23. Secondary winding 23 is wound on core 24.

Primary winding 17 has one end connected through resistance 26 to feedback winding 19. Emitter 27 of transistor 37 is connected to the junction of resistance 26 and primary winding 17. The other side of primary winding 17 is connected to emitter 28 of transistor 32 and through resistance 29 to feedback winding 21. The other end of feedback winding 21 is connected to base 31 of transistor 32.

Collector 33 of transistor 32 is connected through battery 34 to center tap 18 of primary winding 17, and to collector 36 of transistor 37. Base 38 of transistor 37 is connected to the other side of feedback winding 19. Capacitors 39 and 41 are connected in series between collector 36 and base 38 of transistor 37. Resistance 42 is connected between base 38 and the junction of capacitors 39 and 41. Secondary winding 22 has one side connected to one side of secondary winding 23. The other sides of secondary windings 22 and 23 are connected to output terminals 43 and 44.

Figure 3:
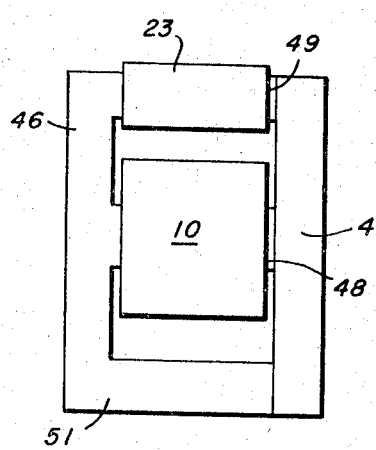
FIG. 3 is a schematic diagram showing the construction of a transformer incorporating the present invention.

Referring to FIG. 3, the physical layout of transformer 10 is shown schematically. E laminations 46 are stacked against I laminations 47. The center leg 48 of E laminations 46 carry all the windings of transformer 10 with the exception of a secondary winding 23. Secondary winding 23 is wound on end leg 49 of E laminations 46.

Figure 4:
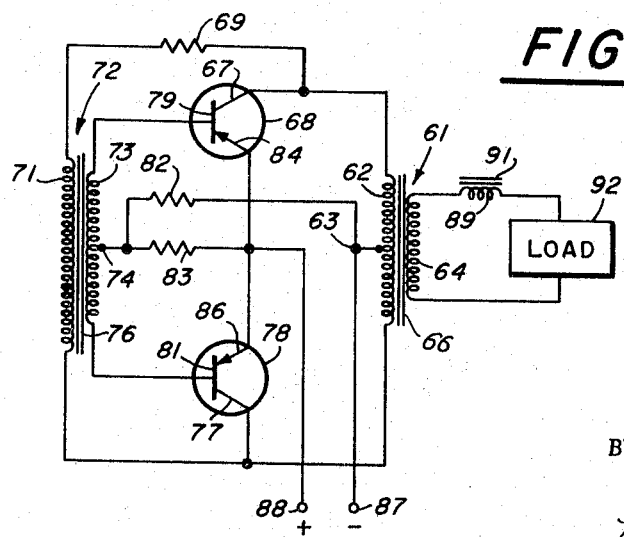
FIG. 4 is a schematic representation of another type of transformer core flux switching oscillator incorporating the present invention.

Referring to FIG. 4, transformer 61 has primary winding 62 with center tap 63 and secondary winding 64 wound on core 66. One side of primary winding 62 is connected to collector 67 of transistor 68 and through resistance 69 to one side of primary winding 71 of feedback transformer 72. Secondary winding 73 of feedback transformer 72 has center tap 74. Both primary winding 71 and secondary winding 73 are wound on saturable core 76. The other side of primary winding 71 is connected to collector 77 of transistor 78 and to another side of primary winding 62 of transformer 61.

One side of secondary winding 73 is connected to base 79 of transistor 68, and the other side connected to base 81 of transistor 78. Center tap 74 of secondary winding 73 is connected through resistance 82 to center tap 63 of primary winding 62 and through resistance 83 to emitters 84 and 86 of transistors 68 and 78, respectively. Terminals 87 and 88 are connected to the negative and positive terminals of a power supply (not shown), respectively.

Secondary winding 64 of transformer 61 has one side connected through inductance 89, having saturable core 91, to load 92. The other side of secondary winding 64 is connected directly to load 92.

*Operation*

Referring back to FIG. 1, a flux switching inverter 11 is coupled through saturable reactance 12 having saturable core 13 to load 14. Generally, in flux switching inverters, if the load becomes too great, i.e., the secondary current of the transformer becomes too great, switching will take place, due to the heavy current demands on the conducting transistor, causing a loss of oscillations and inverter output. It has been found that by adding a saturable reactor in series with the load, that is designed to saturate on overloads faster than the transformer core of the flux switching inverter can saturate, the saturation of the saturable reactor will cause switching at an increased frequency. In this overload condition, the flux switching inverter is then operating in a different mode at a frequency directly proportional to the secondary current. At lower loads, the transformer core will saturate and the flux switching mode of operation, i.e., the normal mode, takes over.

Referring to FIGS. 2 and 3, a practical implementation of this system is shown. Here, secondary winding 23 is linked to only one-half of the primary flux. As shown by FIG. 3, the primary flux has two paths through core 46, one up through I laminations 47 and outside E leg 49, and the other down through I laminations 47 and outside E lamination leg 51. Since the primary flux divides, secondary coil 23 sees only one-half of the primary flux, and acts just as inductance 12 with saturable core 13 in FIG. 1. Although the theory is not completely understood, it has been found that linking the saturable core reactance with the primary also substantially improves the voltage regulation to load and the frequency regulation to load of the inverter. The output voltage is the algebraic sum of the voltages induced into each winding. Again, when the load on the inverter is light, the inverter functions as a common flux switching oscillator, but as the load is increased, a portion of the output voltage is across secondary winding 23. Since the primary circuit with feedback windings 19 and 21 is a conventional state of the art inverter, further explanation is deemed unnecessary.

Referring back to FIG. 4, the primary side of transformer 61 operates as a conventional two transformer inverter, i.e., transformer 72 is utilized as a feedback transformer, the flux switching being accomplished in saturable core 76 instead of in output transformer 61.

The same theory applies to saturable inductance 91 as to saturable core inductance 89 with respect to the circuit of FIG. 2. Saturable core 91 can be a separate core from the two transformers, or can be one leg of core 66 of output transformer 61 in the identical construction as was shown in FIG. 3, except that the feedback windings would not be wound on center leg 48, but only the primary winding 62 and secondary winding 64. Since the inverter circuit per se is conventional and well known to those skilled in the art, and the secondary circuit utilizes the same theory of operation as that of FIG. 2, further explanation is deemed unnecessary.

The transformer construction illustrated in FIG. 3 is exemplary only. A saturable reactor in the secondary circuit will provide the basic inherent self-protection for all loads and provide current limiting. The compact, and economic approach of using one leg of the main transformer for the core of this saturable reactor will work so long as two or more flux loops or paths are provided to effect a partial coupling of secondary winding 23 to primary winding 17. This could equally well be accomplished by two stacks of E laminations or with F and L laminations. The stacks may be butt stacked or interleaved.

It should be understood, of course, that the foregoing disclosure relates to only preferred embodiments of the invention, and that it is intended to cover all changes and modifications of the examples of the invention herein chosen for the purposes of the disclosure, which do not constitute departures from the spirit and scope of the invention.

I claim:

1. A load current limiting transformer core flux switching oscillator comprising:
    a flux switching oscillator having a transformer with a saturable core, a primary winding, at least one feedback winding and an output winding; and
    an inductor having a saturable core connected in serial relationship with said transformer output winding and any load connected thereto, the said saturable core of said inductor being so proportioned that at heavy loads the said saturable core of said inductor causes the oscillator to switch, while at normal loads the saturable transformer core of the said oscillator causes the oscillator to switch whereby variations in the series connected load control the period of saturation of the saturable core inductor to vary the frequency of the oscillator for compensation of load variations.

2. The load current limiting transformer core flux switching oscillator of claim 1 wherein said saturable core inductor's saturable core comprises one leg of said transformer's saturable core.

3. The load current limiting transformer core flux switching oscillator of claim 1 wherein:
   said transformer's saturable core comprises a plurality of flux paths having a common leg; and
   said primary feedback and output winding being carried by said common leg of said core, and said inductor being carried by another leg of said core.

4. A load current limiting transformer core flux switching oscillator comprising:
   a flux switching oscillator having an output transformer with a primary and output winding, and a feedback transformer with a saturable core; and
   an inductor having a saturable core connected in serial relationship with said transformer output winding and any load connected thereto, the said saturable core of said inductor being so proportioned that at heavy loads the said saturable core of said inductor causes the oscillator to switch, while at normal loads the saturable transformer core of the said oscillator causes the oscillator to switch whereby variations in the series connected load control the period of saturation of the saturable core inductor to vary the frequency of the oscillator for compensation of load variations.

5. The load current limiting transformer core flux switching oscillator of claim 4, wherein said saturable core inductor's saturable core comprises one leg of said output transformer's core.

6. The load current limiting transformer core flux switching oscillator of claim 4, wherein:
   said output transformer's core comprises a plurality of flux paths having a common leg; and
   said primary and output windings being carried by said common leg of said core, and said inductor being carried by another leg of said core.

References Cited by the Examiner

UNITED STATES PATENTS

| | | | |
|---|---|---|---|
| 2,852,730 | 9/1958 | Magnuski | 331—113 |
| 2,854,580 | 9/1958 | Uchren et al. | 331—113 |
| 2,905,906 | 9/1959 | Kittl | 331—113 |
| 2,937,298 | 5/1960 | Putkovich et al. | 331—113 |

OTHER REFERENCES

Geyer: Electronics, "Frequency Control of Magnetic Multivibrators," pp. 54–56, July 24, 1959.

ROY LAKE, *Primary Examiner.*

JOHN KOMINSKI, *Assistant Examiner.*